United States Patent
Min

[19]

[11] Patent Number: 6,105,919
[45] Date of Patent: Aug. 22, 2000

[54] LIQUID CRYSTAL DISPLAY WITH WIDE SWIVEL ANGLE

[75] Inventor: Yoon-Ki Min, Suwon, Rep. of Korea

[73] Assignee: SamSung Electronics Co., Ltd., Suwon, Rep. of Korea

[21] Appl. No.: 09/083,998

[22] Filed: May 26, 1998

[30] Foreign Application Priority Data

May 27, 1997 [KR]  Rep. of Korea ................. 97-20943

[51] Int. Cl.[7] .................................................. F16M 13/00
[52] U.S. Cl. ............................................................. 248/418
[58] Field of Search ................................ 248/917, 919, 248/920, 921, 922, 923, 131, 133, 371, 418, 415, 183.1, 183.2

[56] References Cited

U.S. PATENT DOCUMENTS

| | | |
|---|---|---|
| 4,365,779 | 12/1982 | Bates et al. . |
| 4,589,713 | 5/1986 | Pfuhl et al. . |
| 4,591,120 | 5/1986 | Bryant-Jeffries et al. . |
| 4,611,777 | 9/1986 | Ireland . |
| 4,762,378 | 8/1988 | Kagami . |
| 4,807,842 | 2/1989 | Freni, Jr. et al. . |
| 4,852,830 | 8/1989 | Howard et al. . |
| 4,919,387 | 4/1990 | Sampson ........................... 248/371 |
| 5,024,415 | 6/1991 | Purens . |
| 5,108,062 | 4/1992 | Detwiler . |
| 5,335,142 | 8/1994 | Anderson . |
| 5,575,450 | 11/1996 | Lee . |
| 5,588,625 | 12/1996 | Beak . |
| 5,623,392 | 4/1997 | Ma . |
| 5,632,463 | 5/1997 | Sung et al. . |

*Primary Examiner*—Ramon O. Ramirez
*Attorney, Agent, or Firm*—Robert E. Bushnell, Esq.

[57] ABSTRACT

A liquid crystal display (LCD) device includes a display portion supported to a stand by a hinge having a wide swivel angle through swivel rotation means formed in the hinge and stand. The swivel rotation means includes a hinge body connected to the display portion for tilt and having a guide with a rotation guide surface and swivel projections; a swivel bracket fixed to a stand body so that the hinge body does not escape from the stand, the bracket having a stop which arrests the swivel projections; and the stand body having a plurality of bosses functioning as screw bosses for fixing the swivel brackets and at the same time as axial boss which rotates the hinge body. The swivel rotation means' swivel angle is set when the swivel projections formed on the hinge body are arrested by the stop formed on the swivel bracket.

19 Claims, 8 Drawing Sheets

LIQUID CRYSTAL DISPLAY WITH WIDE SWIVEL ANGLE

CLAIM FOR PRIORITY

This application makes reference to, incorporates the same herein, and claims all benefits accruing under 35 U.S.C. §119 from an application for LIQUID CRYSTAL DISPLAY WITH WIDE SWIVEL ANGLE earlier filed in the Korean Industrial Property Office on the 27$^{th}$ of May 1997, and there duly assigned Serial No. 20943/1997, a copy of which application is annexed hereto.

BACKGROUND OF THE INVENTION

Technical Field

The present invention relates to a liquid crystal display for providing visual video displays of images that vary in response to a video signal, and more particularly, to a liquid crystal display with a wide swivel angle at which the liquid crystal display rotates left and right at the reference of its stand.

Related Art

Generally, a display monitor is a peripheral device which processes a video signal from an information data system such as a computer system for a visual video display on a screen. Traditional display monitor is typically a heavy and bulky cathode-ray tube (CRT) as a stand-alone display device for most computer systems. Liquid crystal display (LCD) may be used but because of its limited image resolution and high cost, only in portable computers, known as either laptops or notebook computers, are able to support such a display. For a CRT type of display monitor which is commonly used for most desk-top computer systems, a monitor stand assembly is provided for adjustably moving the monitor in the up-and-down tilt direction and the right-to-left direction to allow a user to fix the monitor in a proper viewing position. Exemplars of contemporary stand assembly for CRT monitors are disclosed in U.S. Pat. No. 4,365,779 for Tilt And Rotate Apparatus For A Display Monitor issued to Bates et al., U.S. Pat. No. 4,589,713 for Video Display Support Joint issued to Pfuhl et al., U.S. Pat. No. 4,611,777 for Computer Terminal Stand issued to Ireland et al., U.S. Pat. No. 4,591,120 for Tiltable And/Or Rotatable Support For Display Device issued to Bryant-Jeffries et al., U.S. Pat. No. 4,762,378 for Display Apparatus issued to Kagami, U.S. Pat. No. 4,807,842 for Tilt Apparatus For A Display Monitor Field issued to Freni, Jr. et al., U.S. Pat. No. 4,852,830 for Computer Monitor Stand issued to Howard et al., U.S. Pat. No. 5,024,415 for Tilt And Swivel Apparatus For A Display Monitor issued to Purens, U.S. Pat. No. 5,575,450 for Monitor Tilting Device issued to Lee, U.S. Pat. No. 5,588,625 for Monitor Stand Assembly issued to Beak, U.S. Pat. No. 5,632,463 for Monitor Stand Assembly issued to Sung et al., and assigned to the same assignee of the instant application. For a LCD type of display monitor which is commonly used for most portable computers, a tilt or swivel mechanism is provided for adjustably moving the LCD in the up-and-down tilt direction or the right-to-left direction such as disclosed in U.S. Pat. No. 5,335,142 for Portable Computer Display Tilt/Swivel Mechanism issued to Anderson, and U.S. Pat. No. 5,623,392 for LCD Assembly With Projection Function issued to Ma.

As display technology for computer systems becomes increasingly sophisticated, liquid crystal display (LCD) monitors, which are lightweight, compact and have an extremely low power consumption relative to heavy and bulky CRT monitors, have been increasingly used as stand-alone flat-panel display monitors for many computer systems. The basic structure of the flat-panel LCD display monitor is consisted of a liquid crystal display (LCD), which is flat and thin panel for providing a visual display of an image in response to an input video signal from a computer system, and an especially designed stand for supporting the LCD and a hinge connected to the stand for adjustably moving the LCD to allow a user to fix the LCD in a proper viewing position. However, a typical LCD monitor has several disadvantages in that the stand is typically large, and is not aesthetically pleasing. Moreover, the typically stand assembly is limited in its rotation and movement. Many stands for LCD monitors permit the user to tilt the LCD in the up-and-down direction but fail to sufficiently address the right-to-left direction.

Many current designs of a stand assembly for flat panel LCD monitors such as commercially available models Brilliance 4500AX from Philips, MultiSync LCD400 with Xtra-View technology from NEC, TFT500 Flat Panel from Compaq, VP140 ViewPanel from ViewSonic, and Vison-Master LP-1014A LCD Panel from Iiyama, provide some flexibilities in the up-and-down tilt direction but generally have a limited swivel angle in the right-to-left direction. Often the user must physically rotate the entire monitor including a stand if the LCD needs to be extended beyond the permitted swivel angle for a proper viewing position.

SUMMARY OF THE INVENTION

Accordingly, it is therefore an object of the present invention to provide a liquid crystal display (LCD) monitor with a wide swivel angle for supporting a wide angle of swivel rotation of a liquid crystal display (LCD).

It is also an object to provide a liquid crystal display (LCD) monitor whose display panel for providing a visual display of an image in response to an input video signal rotates freely in a right-to-left or left-to-right direction.

It is another objective to provide a liquid crystal display (LCD) monitor with a simplified hinge structure accommodating extension of a swivel angle for supporting rotation of the display panel in a left-and-right direction.

These and other objects of the present invention can be achieved by a liquid crystal display comprising: a display panel providing a visual display of a variable image; a stand supporting the display panel; and a hinge structure connecting the display panel to the stand while permitting a user to adjustably move the display panel in an up-and-down tilt direction and a right-and-left direction to fix the display panel in one of a plurality of selected viewing positions when the display panel is mounted on the stand. The hinge structure is comprised of a swivel rotation unit formed therein for permitting the display panel to rotate in the right-and-left direction, via a swivel angle substantially greater than 90 degrees. The swivel rotation unit contains a hinge body rotatably mounted in a rotation guide groove of the stand, and having a guide with a rotation guide surface and swivel projections; and a swivel bracket fixed to the stand so that the hinge body does not escape from the stand, and having a stop which arrests the swivel projections.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1A:
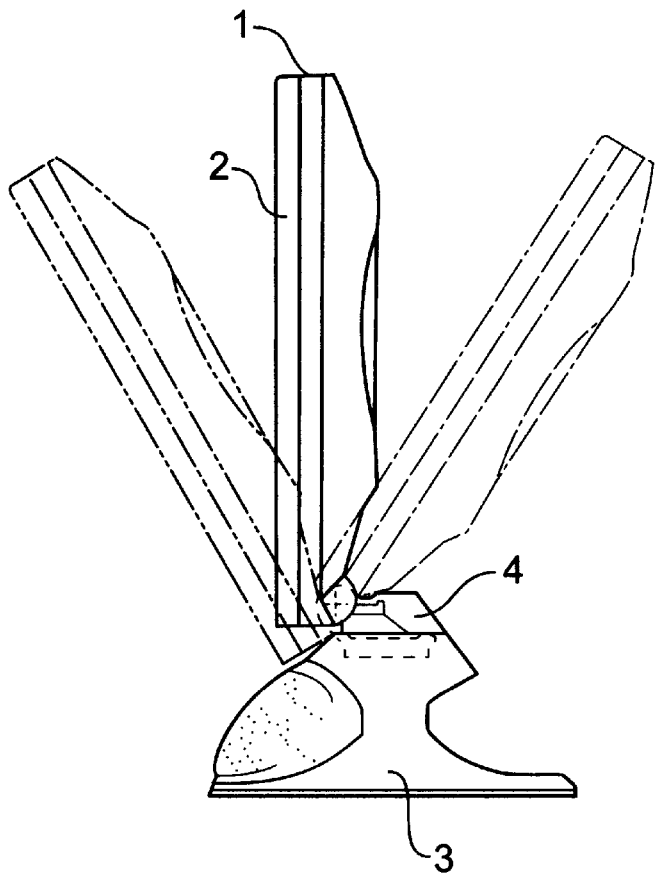
FIG. 1A is a side view of a recently designed liquid crystal display (LCD) monitor adjustable in an up and down tilt direction.
Figure 1B:
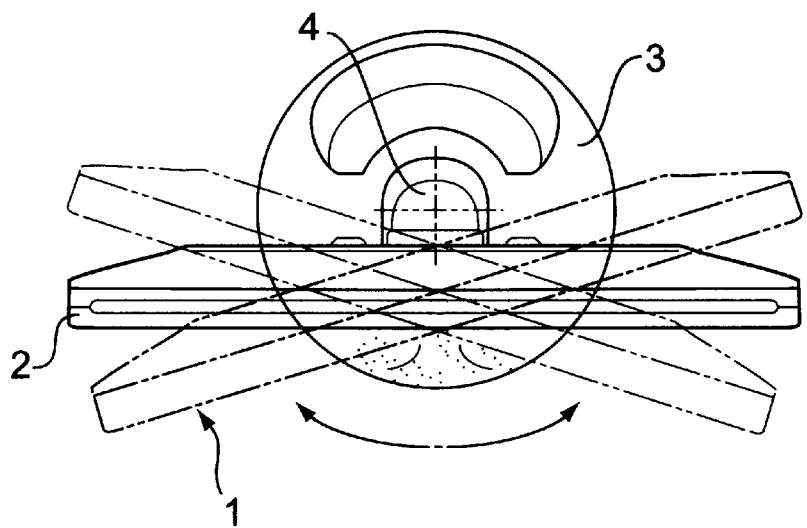
FIG. 1B is a plan view of a recently designed liquid crystal display (LCD) monitor adjustable in a right-to-left and left-to-right swivel direction.

Referring now to the drawings and particularly to FIGS. 1A and 1B, which illustrate a perspective view and a side view of a recently designed flat-panel liquid crystal display (LCD) monitor of a computer system as disclosed in a co-pending U.S. patent application Ser. No. 08/965,644 filed on Nov. 6, 1997, entitled "A Flat-Panel Display Apparatus" and incorporated by reference herein. As shown in FIGS. 1A and 1B, the flat-panel liquid crystal display (LCD) monitor includes a liquid crystal display (LCD) 1 with a liquid crystal panel 2 for providing a visual display of an image in response to an input video signal from the computer system, a stand 3 for supporting the LCD 1, and a hinge structure 4 for connecting the LCD 1 to the stand 3 for adjusting a viewing position of the LCD 1. This LCD monitor is designed to permit the user to adjustably move the LCD in both the up-and-down tilt direction and the right-to-left swivel direction to fix the LCD in a proper viewing position.

Figure 2:
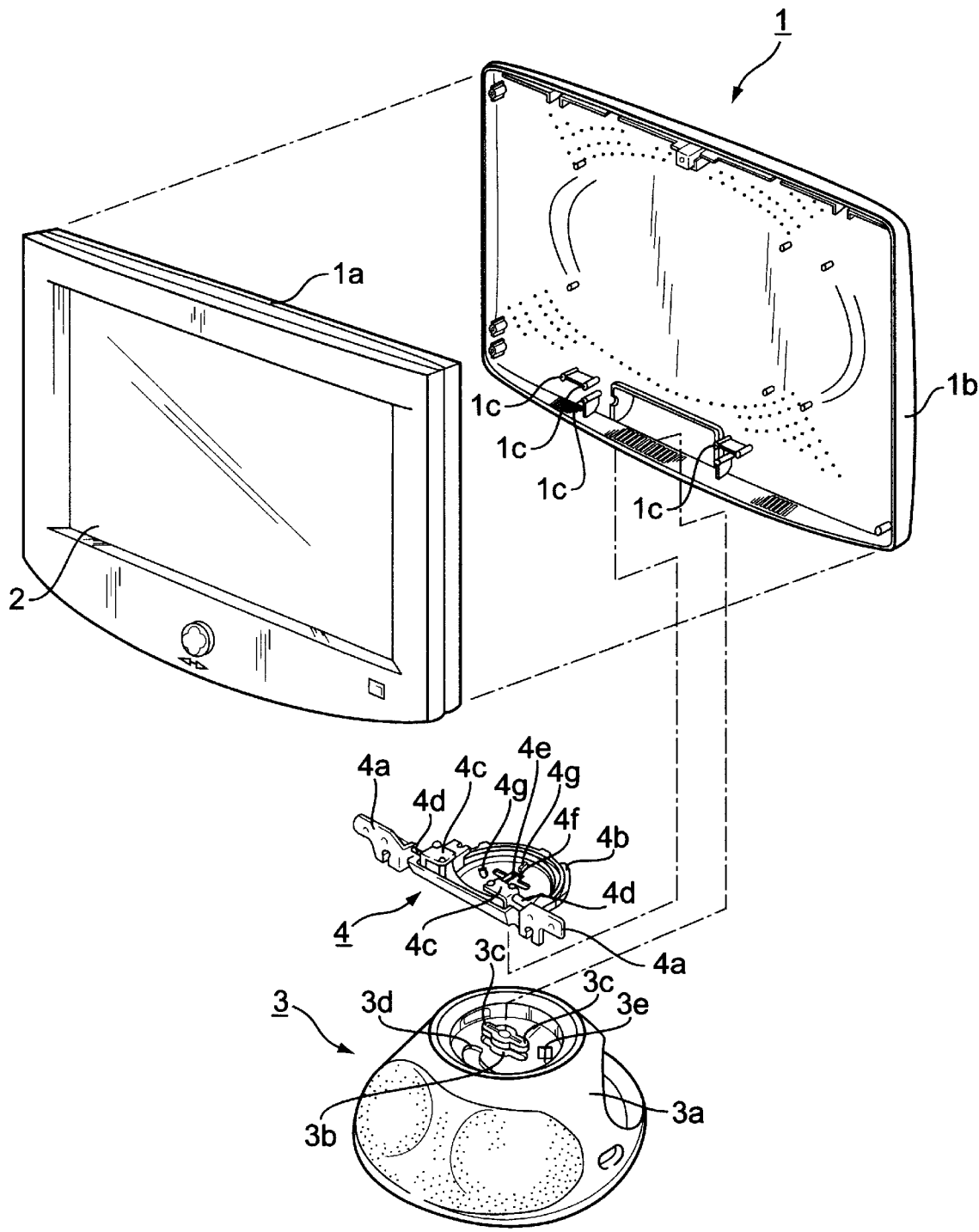
FIG. 2 is an exploded perspective of major components of a recently designed liquid crystal display (LCD) monitor.
Figure 3:
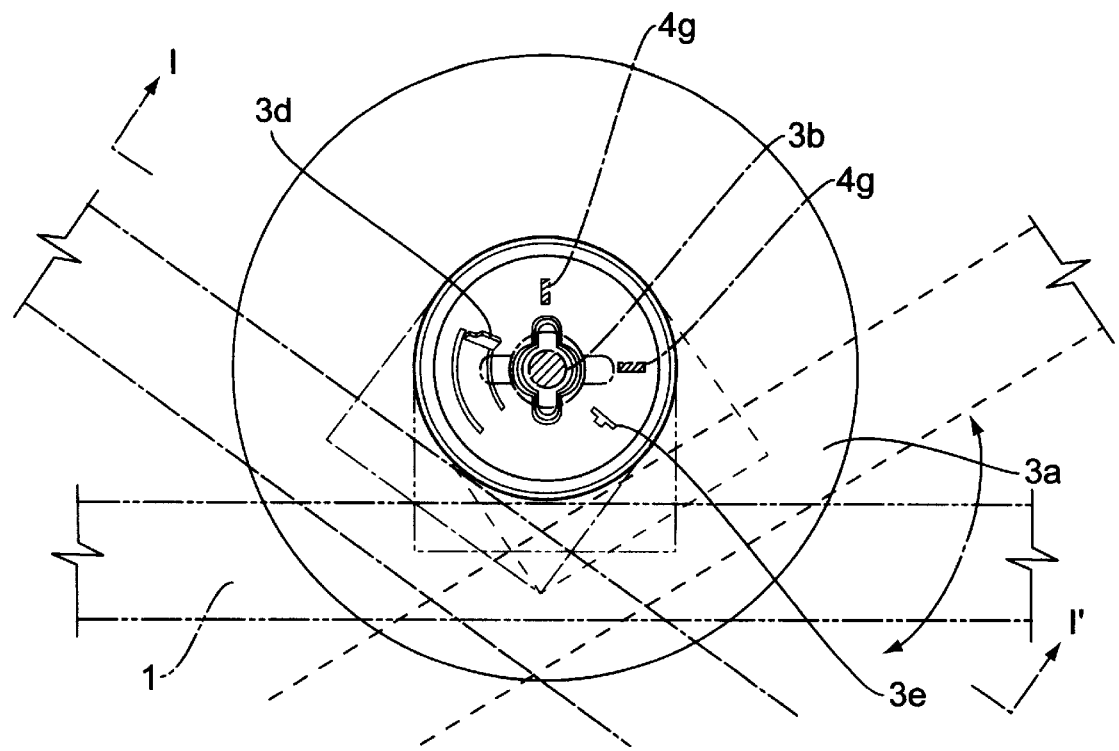
FIG. 3 is a plan view of major components of the recently designed liquid crystal display (LCD) monitor during its swivel operation.
Figure 4:
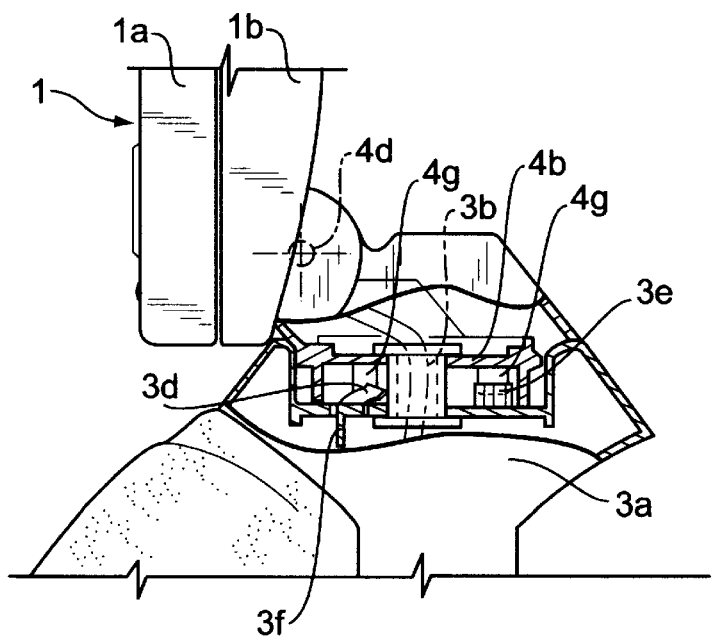
FIG. 4 is a perspective view of major components of FIG. 3 cut along line A–A'.

FIG. 2 provides an exploded, perspective view of major components of a recently designed liquid crystal display (LCD) monitor as shown in FIGS. 1A and 1B. Likewise, FIG. 3 provides a plan view of major components of the recently designed liquid crystal display (LCD) monitor during its swivel operation; and FIG. 4 provides a perspective view of major components of FIG. 3 cut along line A–A'. As shown in FIG. 2, the LCD 1 includes a front case 1a and a rear case 1b which serve as support members for the liquid crystal panel 2, and a main circuit board 70.

A hinge structure 4 is provided for tilt and swivel operation of the LCD 1. The hinge structure 4 includes a pair of display coupling brackets 4a fastened to bosses 1c placed in the lower portion of rear case 1b, and hinge coupling brackets 4c fixed to hinge body 4b with screws. The display/hinge coupling brackets 4a and 4c are connected with a horizontal shaft 4d so that the LCD 1 is secured with display coupling brackets 4a to rotate a up and down tilt direction as shown in FIG. 1A.

A detachment preventive means for hindering hinge body 4b from escaping from stand body 3a, in which detachment preventive rib 3c of vertical hinge shaft 3b is inserted into insertion guide hole 4f of hinge shaft insertion hole 4e formed in hinge body 4b, and is rotated half to form an angle of intersection with the insertion hole and not to separate therefrom. In addition, there are provided swivel angle control means for allowing detachment preventive protrusion 4g placed on the bottom of hinge body 4b to rotate only between the resilient stop 3d and fixed stop 3e of stand body 3a, and left/right rotation means for allowing hinge body 4b to rotate centering on vertical hinge shaft 3b. Because hinge body 4b is able to rotate centering on vertical hinge shaft 3b, LCD 1 can swivel by rotating left and right direction, as shown in FIG. 1B. During the swivel operation, the hinge body 4b rotates in a limited angle of rotation, that is less than 90°. When the detachment preventive rib 3c of vertical hinge shaft 3b coincides with insertion guide hole 4f of rotary hinge body 4b, the rib 3c escapes from the guide hole so that vertical hinge shaft 3b is detached from hinge body 4b.

In order to prevent the hinge body 4b from escaping, two detaching-preventive protrusions are formed on the bottom of hinge body 4b at an interval. They are arrested by resilient stop 3d and fixed stop 3e of stand body 3a so that the hinge body cannot rotate any more. For this reason, insertion guide hole 4f and detachment preventive rib 3c are designed not to be in line and separate from each other when hinge body 4b rotates during swivel. However, when the hinge body 4b should be separated forcibly for the need of, for instance, servicing, the resilient stop 3b is pulled downward and hinge body 4b is rotated to allow detachment preventive protrusions 4g to escape from resilient stop 3d so that insertion guide hole 4f and detaching-preventive rib 3c get in line. On the bottom of resilient stop 3b, a pulling grip 3f is integrally formed as in FIG. 4.

In the LCD monitor as shown in FIGS. 2, 3 and 4, the hinge structure 4 inevitably needs detachment preventive protrusions 4g for hindering hinge body 3afrom escaping from the hinge body 4b. In this condition, detachment preventive protrusions 4g can be rotated only between fixed stop 3e and resilient stop 3d of stand body 3a, and therefore the rotation angle of detachment preventive protrusions 4g results in the swivel angle in which the LCD 1 rotates in a left and right swivel direction.

The swivel angle cannot fall substantially beyond 90° in terms of the hinge structure 4. Accordingly, the range of swivel for adjusting the screen angle of LCD 1 as in FIG. 1B is very limited. In case where the screen angle of LCD 1 must be adjusted over the swivel angle, the user must physically rotate the entire LCD monitor including a stand 3 for a proper viewing position.

Figure 5:
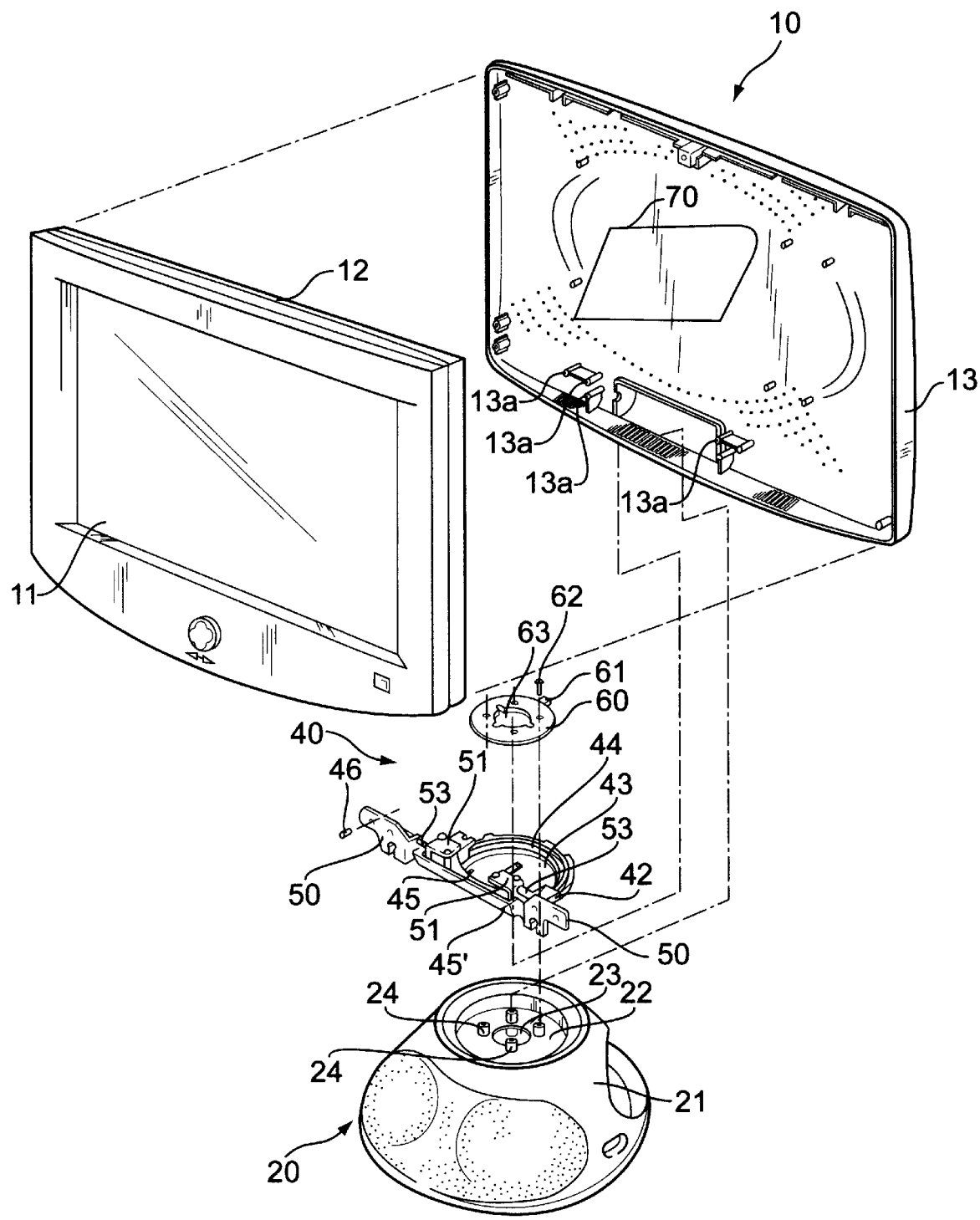
FIG. 5 is an exploded perspective of major components of a liquid crystal display (LCD) monitor constructed according to the principles of the present invention.
Figure 6:
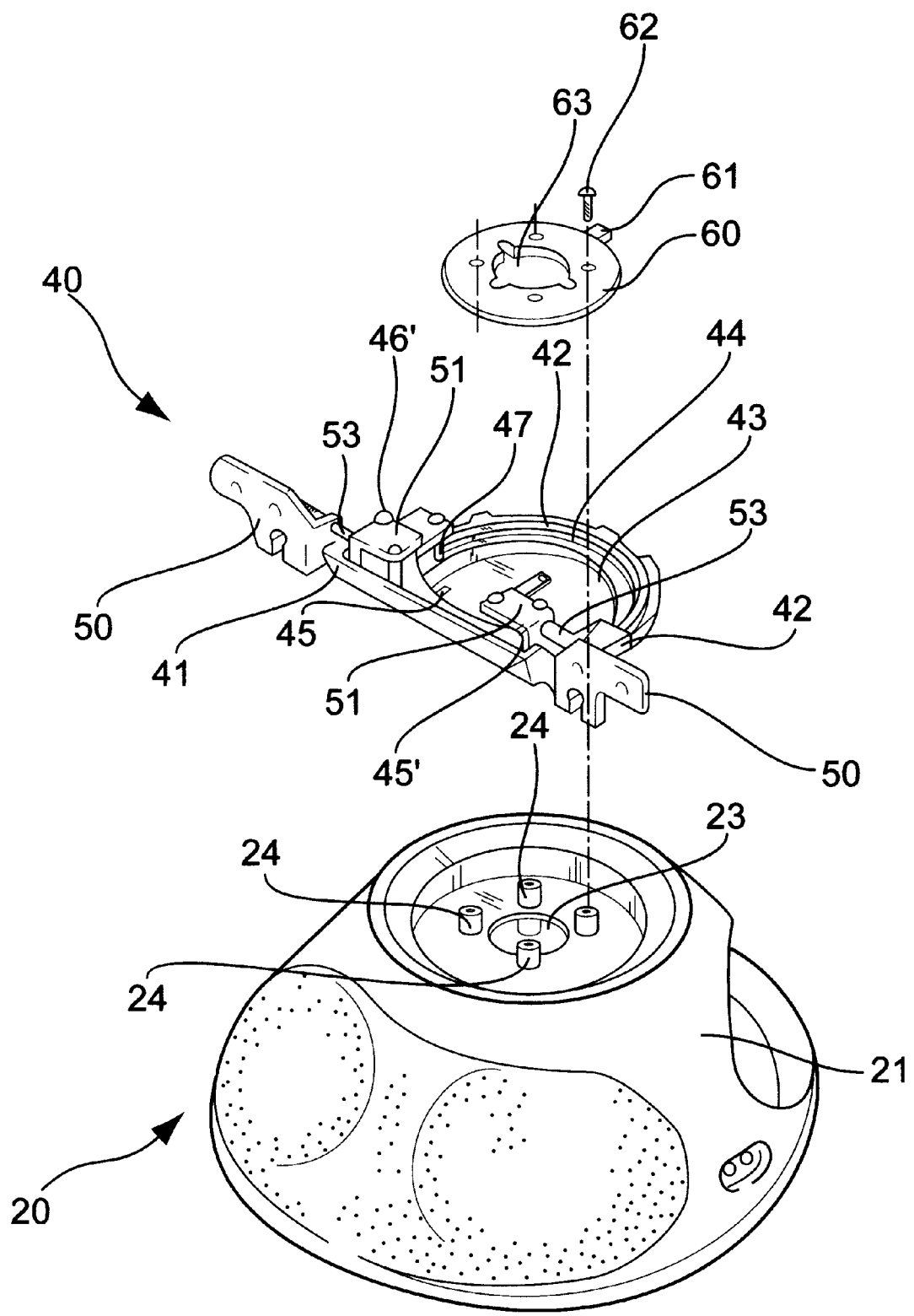
FIG. 6 is an enlarged exploded perspective of major components of the liquid crystal display (LCD) monitor with a swivel operation structure according to the principles of the present invention.

Turning now to FIGS. 5–8, which illustrate a liquid crystal display (LCD) monitor with a wide swivel angle for supporting a wide angle of swivel rotation of a liquid crystal display (LCD) according to the principles of the present invention. As shown in FIG. 5, the LCD 110 includes a liquid crystal panel I11 for providing a variable visual display in response to an input video signal from a computer system, a stand 20 for supporting the LCD 10 and a hinge structure 40 for connecting the LCD 110 to the stand 20 and adjusting a viewing position of the LCD 110.

LCD 10 has the liquid crystal panel 11, and front and rear cases 12 and 13 as supporting members for installing liquid crystal panel 11. Stand 20 has a stand body 21 with built-in speaker and interface circuit. Hinge structure 40 consists of hinge body 41, which has a circular rotation guide surface 42 in the lower portion.

The hinge body 41 having the rotation guide surface 42 is inserted into rotation guide recess 22 formed on top of stand body 21 for swivel rotation. At the center of hinge body 41, rotation guide hole 43 is formed. Around the inner circumference of rotation guide hole 43, there are inserted bosses 24 formed on the periphery of cable hole 23 of stand body 21 through which cable 14 passes. Taking the bosses 24 as one axle, hinge body 41 is rotatable. In the guide 44 forming the rotation guide hole 43 of hinge body 41, two swivel projections 45 and 45' are formed in front. Swivel projections 45 and 45' are integrally formed with hinge body 41 for maintaining an appropriate interval in accordance with the setting of swivel rotation angle of display 10. On one side of hinge body 41, up/down rotation means is provided.

The up/down rotation means includes a display coupling brackets 50 secured with screws 46 to bosses 13aprotruded on the bottom of rear case 13 of display 10, and hinge coupling brackets 51 fastened to bosses 47 of hinge body 41 with screws 46'. Axial bosses 52 and 52' respectively provided in display/hinge coupling brackets 50 and 51 are connected with horizontal shaft 53 so that display coupling brackets 50 are rotatable up and down. By doing so, the LCD 10 to which display coupling brackets 50 are fixed is able to rotate in an upward and a downward direction. The up/down rotation means is provided on both sides of the hinge at the top for the purpose of stable support of LCD 10 at both sides.

The hinge structure 40 further includes a swivel bracket 60, which has an integrally formed stop 61 protruded on one side. The swivel bracket is fixed with screws 62 to bosses 24 protruded from rotation guide recess 22 of stand body 21. Here, reference numeral 63 indicates cable hole.

Figure 7A:
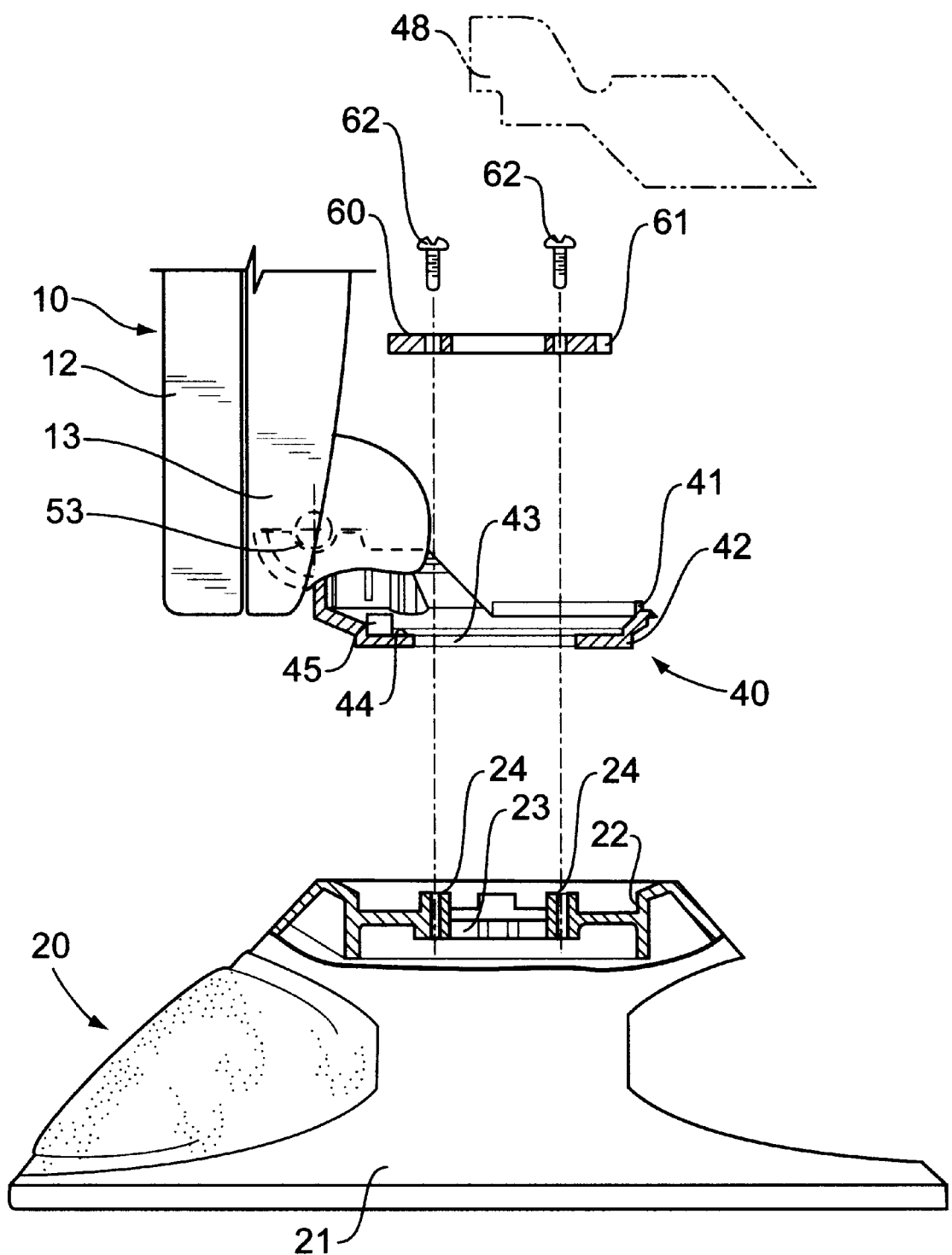
FIG. 7A is an exploded side sectional view of the swivel operation structure indicated in FIG. 6.
Figure 7B:
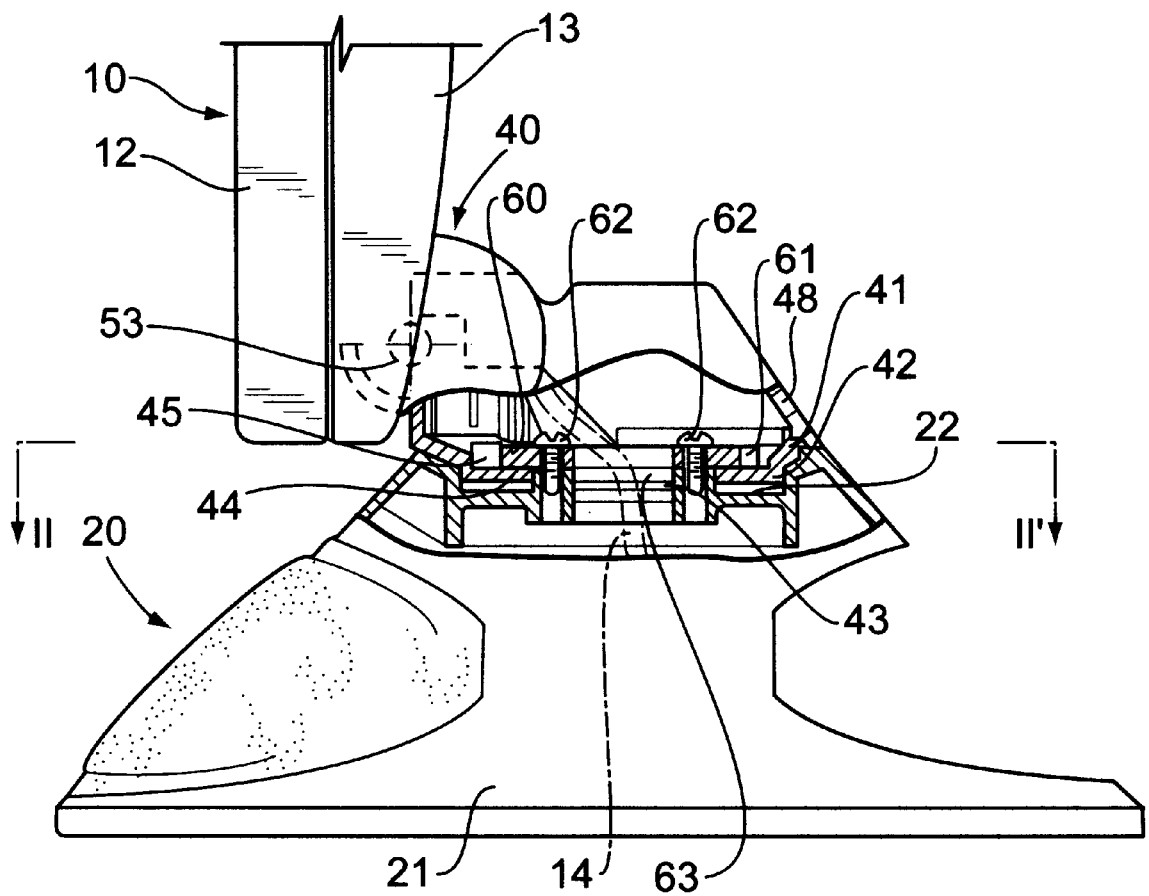
FIG. 7B is an assembled side sectional view of the swivel operation structure shown in FIG. 6.

Now, the process of assembling the LCD monitor according to an embodiment of the present invention will be explained with reference to FIGS. 7A and 7B hereinbelow.

First, the hinge body 41 is joined to the LCD 10 by fixing display coupling brackets 50 to bosses 13aof rear case 13 and then fitting rear case 13 into front case 12. Then, bosses 24 of stand body 21 are inserted into rotation guide hole 43 of hinge body 41, and swivel bracket 60 is put on guide 44 of hinge body 41 and fixed to bosses 24 of stand body 21 with screws 62.

Hinge body 41 is assembled not escaping outward and rotatable centering on bosses 24, when guide 44 is arrested by swivel bracket 60. Hinge body 41 can rotate because swivel bracket 60 is fixed to bosses 24, not strongly compressing guide 44 of hinge body 41. Guide 44 and swivel bracket 60 are joined with as much an assembly tolerance as to allow slippage in surface contact. After assembly so that hinge body 41 is rotatable, hinge cover 48 is put over hinge body 41. Stop 61 of swivel bracket 60 on top of guide 44 is located within the rotation radius where swivel projections 45 and 45' of hinge body 41 rotate. When hinge body 41 rotates, one of swivel projections 45 and 45' is caught by stop 61 to prevent the hinge body from further rotation.

Figure 8:
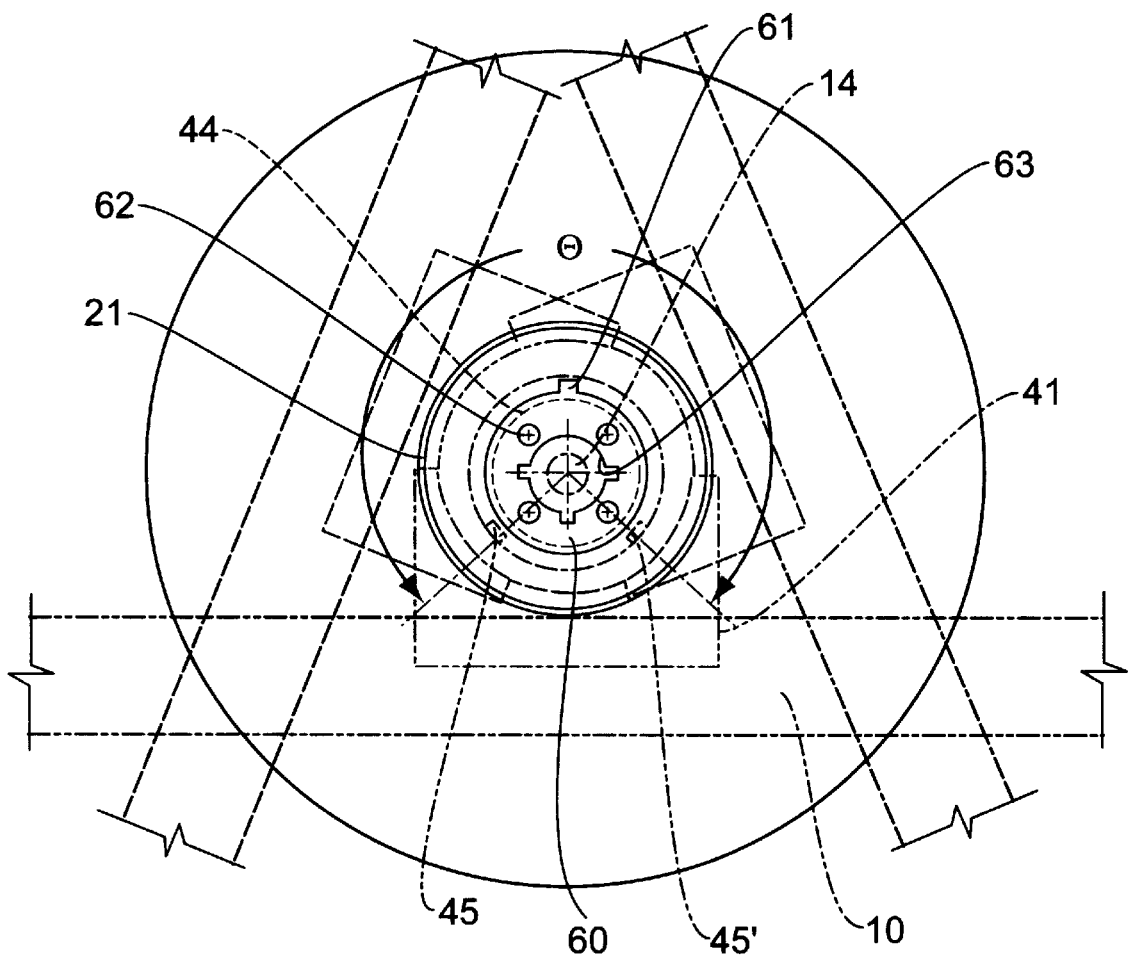
FIG. 8 is a perspective view of the liquid crystal display (LCD) monitor cut along line B–B' of FIG. 7B.

Referring to FIG. 8, in order to adjust the screen angle of liquid crystal panel 11 of LCD 10, the user rotates the LCD 10 to the left or right direction while holding the same. In this state, hinge body 41 connected to display 10 moves in the direction where the user rotates. When the LCD 10 rotates to the left direction, swivel stop 45 placed left rotates and is caught by stop 61 for no further rotation. In the right direction, swivel stop 45' placed right is arrested by stop 61 so that the LCD 10 cannot rotate any further.

As a result, the swivel angle where the LCD 10 is rotated in the left and the right direction to control the screen angle becomes rotation angle θ, which is formed by swivel projections 45 and 45' of hinge body 41 arrested by stop 61. The rotation angle θ of swivel projections 45 and 45' is determined by where they are formed on guide 44 of hinge body 41. If the swivel projections 45 and 45' are formed adjacently, the rotation angle θ becomes wide, but conversely when they are distant, rotation angle θ becomes small.

The rotation angle θ formed depending upon the position of swivel projections 45 and 45' determines the swivel angle wider than most available LCD monitors commercially available today. If the swivel projections 45 and 45' are formed closest, the maximum swivel angle becomes about 355°, an angle where an angle corresponding to their size is subtracted from 360°. However, this large swivel angle is not so required that swivel projections 45 and 45' are positioned to form substantially 290°.

In case of swivel angle 290° in this embodiment, the present invention obtains 200° larger swivel angle than the prior art where it is 90°. The tilt where display 10 is rotated up and down remains the same as the prior art because display coupling bracket 50 is rotated centering on horizontal shaft 53. With a liquid crystal display obtained in the present invention, the swivel angle as well as the tilt operation is so wide that only display 10 needs to be moved in the swivel direction, not rotating the stand 20 itself.

As described above, the present invention provides a large swivel angle for a liquid crystal display (LCD) monitor to conveniently adjust for a proper viewing position. In addition, the liquid crystal display (LCD) of the present invention is simplified in structure, as a reliable product.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A liquid crystal display device, comprising:
a display panel providing a visual display of a variable image;
a stand supporting the display panel; and
a hinge structure connecting the display panel to the stand while permitting a user to adustably move the display panel in an up-and-down tilt direction and a right-and-left direction to fix the display panel in one of a plurality of selected viewing positions when the display panel is mounted on the stand, said hinge structure having swivel rotation means formed therein for permitting the display panel to rotate in the right-and-left direction, via a swivel angle of substantially greater than 90 degrees, wherein said swivel rotation means comprises:

a hinge body rotatably mounted in a rotation guide groove of the stand, and having a guide with a rotation guide surface and swivel projections; and a swivel bracket fixed to the stand so that the hinge body does not escape from the stand, said swivel bracket having a stop which arrests the swivel projections.

2. The liquid crystal display device of claim 1, further comprised of said display panel comprising a liquid crystal panel on which said variable image is displayed, front and rear cases, and a main circuit board installed between the front and rear cases for receiving said video signal from the computer system to provide a visual display of said variable image.

3. The liquid crystal display device of claim 1, wherein the stand is comprised of a stand body having a plurality of bosses separately mounted on the rotation guide groove for fixing the swivel brackets and at the same time serving as axial bosses for enabling rotation of the hinge body.

4. The liquid crystal display device of claim 3, wherein the stop formed on the swivel bracket is one, the swivel projections caught by the stop corresponds to a pair.

5. The liquid crystal display device of claim 1, wherein the stop formed on the swivel bracket is one, the swivel projections caught by the stop corresponds to a pair.

6. The liquid crystal display device of claim 1, wherein said swivel rotation means permits the setting of a swivel angle when the swivel projections formed on the hinge body are arrested by the stop formed on the swivel bracket.

7. The liquid crystal display device of claim 6, wherein a rotation angle formed between the pair of swivel projections becomes the swivel angle.

8. The liquid crystal display device of claim 7, wherein the swivel angle is 290°.

9. The liquid crystal display device of claim 1, further comprising a cable extended from the stand to the display panel for supplying electrical power and transmitting said video signal from the computer system to the display panel for providing a visual display of said variable image.

10. A liquid crystal display device, comprising:

a display panel providing a visual display of a variable image;

a stand supporting the display panel; and a hinge structure connecting the display panel to the stand while permitting a user to adjustably move the display panel in an up-and-down tilt direction and to rotate the display panel in a right-and-left direction, via a swivel angle, to fix the display panel in one of a plurality of selected viewing positions when the display panel is mounted on the stand, said hinge structure comprising:

a hinge body rotatably mounted on the stand, and having a guide with a rotation guide surface and swivel projections; and a swivel bracket fixed to the stand so that the hinge body does not escape from the stand, said swivel bracket having a stop which arrests the swivel projections.

11. The liquid crystal display device of claim 10, further comprised of said display panel comprising a liquid crystal panel on which said variable image is displayed, front and rear cases, and a main circuit board installed between the front and rear cases for receiving said video signal from the computer system to provide a visual display of said variable image.

12. The liquid crystal display device of claim 10, wherein the stand is comprised of a stand body having a plurality of bosses separately mounted on the rotation guide groove for fixing the swivel brackets and at the same time serving as axial bosses for enabling rotation of the hinge body.

13. The liquid crystal display device of claim 12, wherein said hinge structure permits the setting of a swivel angle when the swivel projections formed on the hinge body are arrested by the stop formed on the swivel bracket.

14. The liquid crystal display device of claim 13, wherein the stop formed on the swivel bracket is one, the swivel projections caught by the stop corresponds to a pair.

15. The liquid crystal display device of claim 12, wherein the stop formed on the swivel bracket is one, the swivel projections caught by the stop corresponds to a pair.

16. The liquid crystal display device of claim 15, wherein a rotation angle formed between the pair of swivel projections becomes the swivel angle.

17. The liquid crystal display device of claim 16, wherein the swivel angle is 290°.

18. The liquid crystal display device of claim 17, further comprised of said display panel comprising a liquid crystal panel on which said variable image is displayed, front and rear cases, and a main circuit board installed between the front and rear cases for receiving said video signal from the computer system to provide a visual display of said variable image.

19. The liquid crystal display device of claim 10, further comprising a cable extended from the stand to the display panel for supplying electrical power and transmitting said video signal from the computer system to the display panel for providing a visual display of said variable image.

* * * * *